Jan. 27, 1970  J. A. CONSIGLIO ET AL  3,492,162
FUEL CELL AND METHOD FOR GENERATING ELECTRICAL
ENERGY BY BURNING A PORTION OF THE FUEL
Filed July 27, 1965  2 Sheets-Sheet 1
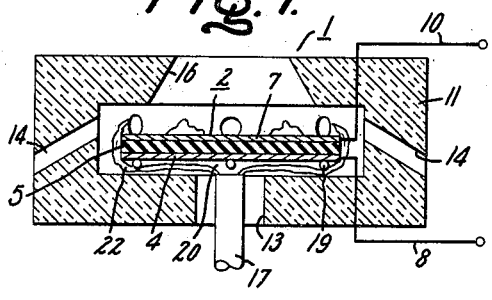
Inventors:
Joseph A. Consiglio,
Robert P. Hamlen,
Ronald R. Nilson,
Everett E. Stone,
by Paul A. Frank
Their Attorney.

Jan. 27, 1970          J. A. CONSIGLIO ET AL          3,492,162
       FUEL CELL AND METHOD FOR GENERATING ELECTRICAL
           ENERGY BY BURNING A PORTION OF THE FUEL
Filed July 27, 1965                                2 Sheets-Sheet 2

Inventors:
Joseph A. Consiglio,
Robert P. Hamlen,
Ronald R. Nilson,
Everett E. Stone, by Paul A. Frank
Their Attorney.

United States Patent Office
3,492,162
Patented Jan. 27, 1970

3,492,162
FUEL CELL AND METHOD FOR GENERATING ELECTRICAL ENERGY BY BURNING A PORTION OF THE FUEL
Joseph A. Consiglio, Schnectady, Robert P. Hamlen, Scotia, Ronald R. Nilson, Schenectady, and Everett E. Stone, Scotia, N.Y., assignors to General Electric Company, a corporation of New York
Filed July 27, 1965, Ser. No. 475,058
Int. Cl. H01m 27/22, 27/28, 27/02
U.S. Cl. 136—86    9 Claims

ABSTRACT OF THE DISCLOSURE

A method for generating electrical energy from an intermediate temperature fuel cell employs reacting electrochemically a portion of the fuel at the anode and burning a portion of the fuel adjacent the anode thereby heating the cell to its operating temperature. An intermediate temperature fuel cell has an anode, means to supply fuel to the anode, a cathode, means to supply at least an oxidant to the cathode, and an electrolyte between the anode and cathode, in which fuel cell burner means are employed adjacent the anode for supplying fuel to the anode and for supplying heat to the cell.

---

Figure 5:
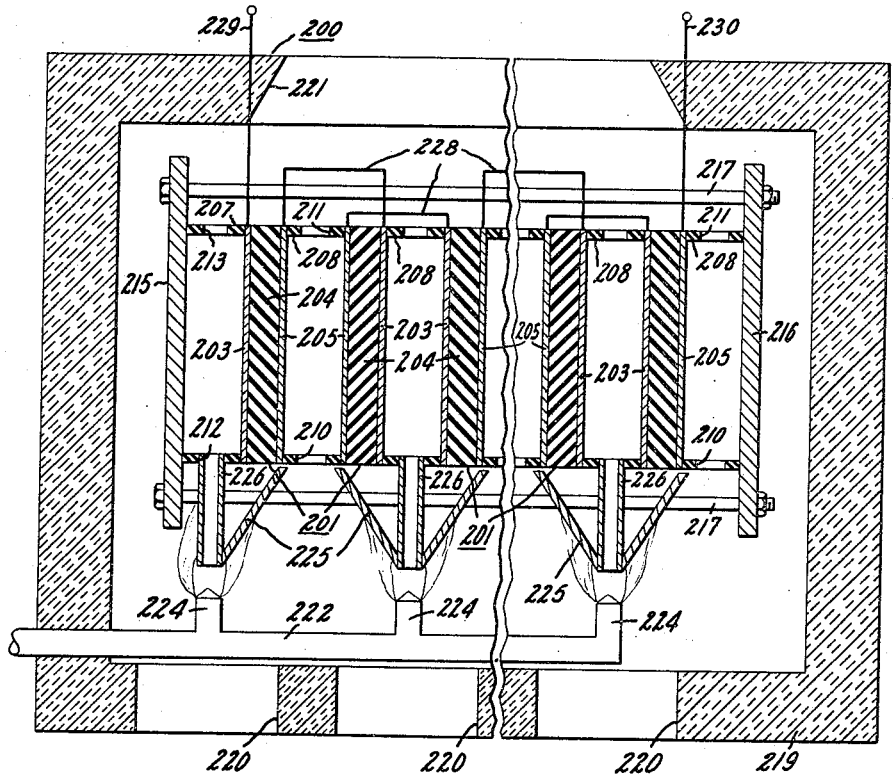

Our invention relates to novel processes of generating electrical energy and to improved intermediate temperature fuel cell and battery units.

In constructing fuel cells for operation at ambient temperatures, an anode and a cathode are separated by means forming a chamber for a liquid electrolyte or by a solid electrolyte element, such as an ion exchange membrane. In order to produce electrical energy a fuel cell must electrocatalytically reduce oxidant at the cathode and oxidize fuel at the anode. In the event that fuel and oxidant are both present at either the anode or cathode, a direct chemical reaction is obtained rather than the electrochemical oxidation-reduction required for generation of electricity.

Accordingly, it is the accepted practice in constructing fuel cells to include elements to positively prevent mixing oxidant and fuel supplied. A fixture forming a fuel chamber is sealingly mounted adjacent the anode, and, where an oxidant other than ambient air is contemplated, a fixture defining an oxidant chamber is similarly mounted at the cathode. Fuel and oxidant are separately supplied to and exhausted from the respective fixtures by fluid conduits sealingly attached thereto.

Intermediate temperature fuel cell units are conventionally patterned on ambient temperature fuel cells, differing principally in the cumulative addition of means to maintain the unit above atmospheric temperature. This means typically takes the form of any conventional heating unit, such as an oven, electrical heating coil, etc., which may be conveniently added to the fuel cell or battery unit without extensive structural modification.

It is an object of our invention to provide intermediate temperature fuel cell and battery units in which the functions of heating and fuel supply are efficiently combined.

It is a separate object to provide a process of generating electrical energy at intermediate temperatures in which the steps of maintaining operating temperatures and supplying fuel are combined.

It is a specific object to provide carbonate electrolyte fuel cell and battery units in which the functions of heating, oxidant modification, and fuel supply are efficiently combined.

It is another object to provide a process of generating electrical energy in which fuel from a unitary source is used to heat, electrochemically react with, and chemically modify oxidant supplied to a fuel cell or battery unit.

It is yet another object to provide intermediate temperature fuel cell and battery units and processes of electrical energy generation in which the requirement of sealingly isolating fuel and oxidant is eliminated.

It is a further object to provide intermediate temperature fuel cell and battery units and processes of electrical energy generation in which convection forces are used to direct and distribute reactants.

These and other objects of our invention are accomplished by burning a portion of a fuel supplied to a fuel cell to maintain the cell at operating temperature. In a preferred form, a fuel is utilized capable of reacting in two or more stages. Fuel is partially reacted to deliver heat to the cell and is transported to the cell anode in a state of incomplete reaction. The fuel is further reacted electrochemically at the cell anode. In the event a carbon dioxide consuming cell, such as an alkali carbonate cell, is utilized, a portion of a carbonaceous fuel may be completely burned and mixed with oxidant. In the event a fuel cell is utilized which operates most efficiently below flame temperature, such as a phosphoric acid electrolyte cell, an incompletely reacted portion of the fuel may be removed from the flame and transported to the cell anode while deflecting the flame from direct impingement with the electrolyte portion of the cell.

Electrical energy generating units constructed according to our invention include at least one intermediate temperature fuel cell. A fuel conduit is related to the cell to direct a flame propagated by a portion of the fuel into a heat transfer relation with the cell. Preferably, the fuel conduit is directed for flame impingement of the cell and in cells operating at approximately flame temperature on multiple stage reactive fuels, the conduit may be oriented for flame impingement of the anode. In cells where operation substantially less than flame temperature is desired, a baffle may be provided to deflect flames from direct impingement with the electrolyte portion of the cell. The unit may optionally include a thermally insulative enclosure means surrounding the fuel cell to reduce heat dissipation.

Our invention may be better understood by reference to the following detailed description taken in conjunction with the drawings, in which FIGURE 1 is a vertical section of one form of a fuel cell unit, FIGURE 2 is a vertical section of an alternate form of a fuel cell unit, FIGURE 3 is a vertical section of a second alternate form of a fuel cell unit, FIGURE 4 is a vertical section of a double cell unit, and FIGURE 5 is a vertical section of a fuel battery unit.

The term "intermediate temperature" as applied to fuel cells and batteries in this specification refers to units operating in a temperature range of from 85° C. to 800° C., preferably 100° C. to 800° C.

Numerous anode-electrolyte-cathode combinations are known to the art which operate most efficiently at intermediate temperatures. As exemplary of aqueous electrolye type intermediate temperature cells, Cairns in commonly assigned application Ser. No. 357,348, filed Apr. 1, 1964, now abandoned, discloses a cell using an aqueous electrolyte containing cesium or rubidium cations and hydroxyl, carbonate, or bicarbonate anions intended to operate in the temperature range of from approximately 75° C. to 190° C. Also, Grubb in commonly assigned application Ser. No. 271,356, filed Apr. 8, 1963, now abandoned, discloses a cell using an aqueous phosphoric acid electrolyte intended to operate in the temperature range of from 130° C. to 250° C. As exemplary of polymeric electrolyte type intermediate temperature cells, Hamlen in commonly assigned application Ser. No. 140,449, filed Sept. 25, 1961, and now abandoned, discloses zirconium phosphate electrolyte fuel cells intended to operate in the temperature range of from 100° C. to 200° C. As exemplary of aqueous electrolyte intermediate temperature cells having the electrolyte contained in a matrix, Hamlen in commonly assigned application Ser. No. 446,035, filed Apr. 6, 1965, discloses cells having phosphoric acid electrolyte contained in a zirconium phosphate matrix intended to operate in the range of from 85° C. to 200° C., preferably 100° C. to 200° C. In addition to the above types of intermediate temperature cells, molten electrolyte cells, particularly alkali carbonate electrolyte cells, are well understood in the art. Alkali carbonate cells operate in the range of from 350° C. to 800° C. Exemplary specific alkali carbonate electrolyte cell arrangements are described by Hamlen et al. in commonly assigned application Ser. No. 426,269, filed Jan. 18, 1965, and by McQuade et al. in commonly assigned application Ser. No. 428,337, filed Jan. 27, 1965, now Patent 3,268,365.

In the practice of our invention, a portion of the fuel supplied to the intermediate temperature fuel cell or battery unit is chemically oxidized to heat the unit to the desired operating temperature. This may be practically accomplished by burning a portion of the fuel in air, or, if another type of oxidant is being supplied to the cell, in a portion of such other oxidant.

In units operating near the flame temperature, such as alkali carbonate electrolyte units, for example, it may be desired to impinge the heating flame directly upon the unit. Further, where a fuel is employed which oxidizes in distinct stages, it may be desired to partially react all of the fuel supplied to the unit to liberate heat and to impinge a portion of the partially reacted fuel on an anode where the fuel may be finally reacted electrochemically.

To more specifically illustrate our concept, when a carbonaceous fuel, such as an alkane, for example, is burned in air or oxygen, a flame is produced which exhibits two distinct, somewhat conical visual zones. In the inner zone, partial oxidation occurs which produces substantial amounts of carbon monoxide and hydrogen along with various miscellaneous oxidation products. As the inner portion of the flame impinges the anode, the hydrogen and carbon monoxide formed in the inner flame zone react according to the following equations:

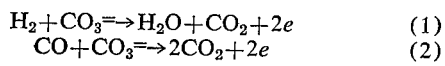

$$H_2 + CO_3^= \rightarrow H_2O + CO_2 + 2e \quad (1)$$
$$CO + CO_3^= \rightarrow 2CO_2 + 2e \quad (2)$$

The carbon dioxide formed by the electrochemical reactions of Equations 1 and 2 as well as the carbon dioxide that is formed by any portion of the fuel that may completely chemically oxidize, mixes with the oxidant to supply necessary carbon dioxide to the cathode. The cathode reaction, of course, follows the conventional equation:

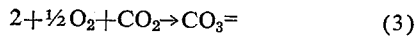

$$2 + \tfrac{1}{2}O_2 + CO_2 \rightarrow CO_3^= \quad (3)$$

A distinct advantage of multiple stage fuel oxidation according to our invention is that the cumbersome fixtures and conduits previously considered necessary to sealingly isolate fuel and oxidant may be completely discarded. By impinging the inner flame zone directly on an anode, the desired control of fuel and oxidant are achieved without the use of cumbersome fixtures or sealingly attached conduits. Further, the separate operation of injecting carbon dioxide into the oxidant as previously required in alkali carbonate units is completely eliminated. The convective currents carrying reaction products from each anode simultaneously deliver carbon dioxide to the oxidant adjacent each cathode. Accordingly, a significant simplification of the steps required in generating electrical energy is achieved.

Where a fuel is employed which reacts in a single stage, such as hydrogen, for example, only a portion of the fuel is ignited to heat the unit. This can be accomplished by separately delivering a portion of the fuel to the anode or anodes for electrochemical reaction and delivering a remaining portion to a burner. Alternately, all the fuel may be supplied to the unit for electrochemical utilization and excess fuel exhausted from the unit for burning. The burned portion of the fuel mixes convectively with air or other oxidant to supply carbon dioxide to the cathode or cathodes of the unit. It is appreciated that the described processes of oxidizing single stage reacting fuels are also fully applicable to the multi-stage reacting fuels, although it is generally preferred to react multi-stage reacting fuels in the manner previously described.

In applying our invention to fuel cell or battery units operating significantly below flame temperature—i.e., at 200° C. or lower—the heating flame should not impinge directly on the electrodes or electrolyte. This may be accomplished by spacing the flame from the unit in heat transfer relation therewith. It is generally preferred, however, that the flame be maintained in close proximity to the unit, but deflected from direct impingement on the electrodes and electrolyte of the unit. This technique allows effective heat transfer without undesirable localized overheating.

When employing a multi-stage reacting fuel with units to be maintained significantly below flame temperature, it is generally preferred that the fuel portion to be electrochemically reacted within the unit be transported from the inner zone of the flame to a unit anode while isolated from oxidant, whereby complete chemical oxidation of the transported fuel portion is effectively prevented. This may be accomplished by providing a conduit extending from adjacent an anode to the inner flame zone. It is generally preferred to direct the outer flame zone adjacent to but spaced from a unit cathode, whereby convective currents will be generated. The convective currents are advantageously employed to create circulation adjacent a cathode in a unit utilizing ambient air as oxidant.

Noting FIGURE 1, a fuel cell unit 1 is comprised of a fuel cell 2 including a laminated unit formed of an anode 4, an electrolyte component 5, and a cathode 7. Schematically illustrated are electrical leads 8 and 10 attached to the anode and cathode respectively. A thermally insulative enclosure 11 surrounds the shell and is provided with a primary inlet opening 13 and a plurality of secondary inlet openings 14. An exhaust opening 16 is provided in the upper portion of the enclosure. A fuel supply conduit 17 is mounted within the primary inlet opening. Supporting rods 19 are shown mounting the fuel cell spaced from the enclosure.

Knowing the approximate flame temperature of the fuel to be employed, any conventional combination of anode, electrolyte component, and cathode having efficient operating characteristics at or near flame temperature may be assembled to form fuel cell 2. The anode 4 and cathode 7 may be united to the electrolyte component 5 by any of a variety of conventional techniques, such as pressing, flame-spraying, etc. As a specific illustration, when it is desired to use a carbonaceous fuel such as a hydrocarbon, the electrolyte component may be formed of a magnesium oxide matrix impregnated with alkali carbonate, the anode formed of a flame-sprayed nickel layer, and the cathode formed of a flame-sprayed silver layer. A wide variety of alternative conventional structures would, of course, be equally suitable.

Fuel is supplied to the unit through conduit 17. The fuel partially oxidizes by burning in ambient air drawn through primary inlet 13. The partially oxidized fuel portion impinges against the anode spreading outwardly to substantially cover the entire exterior area thereof. The flame also exhibits an outer zone 22 which effectively insulates the inner zone 20 from ambient air. The reaction products are transported convectively toward outlet opening 16 and thereby aspirate through inlets 14 additional air into the enclosure for contact with the cathode. The fuel cell unit construction illustrated is particularly advantageous for use with carbon dioxide consuming cells, since the flame effectively supplies an intimate mixture of carbon dioxide and oxidant to the cathode.

FIGURE 2 illustrates a fuel cell unit 25 including a fuel cell 26 formed of an anode 28, an electrolyte component 29, and a cathode 30. Electrical leads 32 and 33 are schematically illustrated connected to the anode and cathode respectively. The fuel cell is spaced from a surrounding enclosure 35 by supporting rods 36. A fuel supply conduit 38 enters the enclosure beneath the fuel cell. A primary oxidant supply conduit 39 extends from a main oxidant supply conduit 40 to the fuel supply conduit 38. Secondary oxidant supply conduits 42 and exhaust duct 44 extend through the enclosure above the fuel cell. The secondary oxidant supply conduits 42 are connected to an oxidant manifold 43 which in turn receives oxidant from the main oxidant supply conduit.

Like fuel cell 2 in FIGURE 1, fuel cell 26 is an intermediate temperature fuel cell of conventional anode, electrolyte component, and cathode construction chosen for operating efficiency at or near flame temperature. Fuel is supplied to the unit through conduit 38. Prior to exit from the fuel conduit, primary oxidant is mixed with the fuel by transporting oxidant from main conduit 40 through conduit 39 to the fuel supply conduit. A multi-stage reacting fuel is utilized such that as the fuel oxidant mixture leaving the fuel supply conduit impinges the anode 28, an inner flame zone 45 is formed in which the fuel is incompletely oxidized. Surrounding the inner flame zone is an outer flame zone 46 in which fuel is reacted to complete oxidation. Oxidant is additionally supplied to the enclosure through secondary oxidant conduits 42. The electrochemical reactions of the fuel cell unit 25 are essentially similar to those in fuel cell unit 2; however, unit 25 is not limited to ambient air as an oxidant but may employ any gaseous oxidant of known utility with intermediate temperature fuel cells.

FIGURE 3 illustrates a fuel cell unit 50 including a fuel cell 51 comprised of an electrolyte component 53, an anode 54, and a cathode 56. Adjacent the cathode is mounted an annular fixing 57 forming a central opening 59. A fixture 60 is mounted adjacent the anode. The cathode and anode fixtures include annular flanges 62 and 63, respectively. Insulating gaskets 65 are mounted in apertures 66 in each of the flanges. The fixtures are joined by tie-bolt assemblies 68 extending through the apertures in contact with the insulating gaskets.

Fuel is supplied to the fixture 60 through inlet conduit 69 and is exhausted from the fixture through conduit 70. A burner 72 is mounted at the exterior extremity of the exhaust conduit. Electrical leads 73 and 75 are shown extending from the cathode and anode, respectively.

An enclosure 76 formed of a thermally insulative material is schematically illustrated. The enclosure includes an oxidant inlet port 77 and an exhaust port 79.

In operation, fuel is supplied to the anode fixture 60 through fuel inlet conduit 69. Inside the fixture, a portion of the fuel is electrochemically reacted at the anode 54. The excess fuel is exhausted through conduit 70 to burner 72 to produce a flame 80 contacting the anode fixture. Oxidant is supplied to the flame through inlet port 77. Convective currents carry the excess oxidant and reaction products upwardly into contact with the cathode 56 and ultimately through port 79.

It is noted that fuel cell unit 50 may utilize an electrolyte component which operates at, near, or substantially below the flame temperature, since the operating temperature of the cell may be controlled merely by controlling the amount of excess fuel supplied to the burner. Further, the unit may use fuels which oxidize in a single stage or in multiple stages. Like fuel cell units 1 and 25, fuel cell unit 50 is capable of convectively supplying carbon dioxide to the cathode.

FIGURE 4 illustrates a double cell unit 90 including central annular spacer 91 having an exhaust port 93 and an inlet port 94. Anodes 96 and 97 are mounted adjacent the spacer. Shims 99 and 100 lie outwardly of the anodes. Shim 100 is adapted to receive an electrolyte inlet conduit 102 while shim 99 is adapted to receive an electrolyte outlet conduit 105. Shims 99 and 100 are connected by an electrolyte transfer conduit 103. Mounted exteriorly of the shims are cathodes 106 and 108. Clamping rings 109 and 110 lie exterior of the cathodes. The double cell is held in assembled relation by tie-bolt units 112.

A burner 113 is mounted below the cells of the unit. An inlet tube 114 extends from the inlet port 94 into an inner, partial oxidation zone 116 of a flame formed by the burner. An outer, complete oxidation zone 117 of the flame is deflected away from the cells by a baffle 115 supported by the inlet tube 114.

The negative terminal of the double cell unit is formed at 118 by electrical connection to the anode 97. The positive terminal at 119 of the double cell unit is formed by electrical connection to the cathode 106. As shown, the cells are connected in series by a lead 120 extending between the anode 96 and the cathode 108.

In generating electrical energy with the double cell unit 90, a liquid electrolyte is employed which operates substantially below flame temperature but well above ambient temperatures, such as phosphoric acid, for example. Electrolyte is introduced between anode 97 and cathode 108 through inlet conduit 102. Electrolyte is transferred from the interior of shim 100 to between anode 96 and cathode 106 by transfer conduit 103. Electrolyte is exhausted from the unit through outlet conduit 105.

A multi-stage oxidizing fuel is supplied to the unit through a burner 113. The fuel partially oxidizes in an inner zone 116. The partially oxidized fuel enters inlet tube 114 and is conducted to the interior of the annular spacer 91 to be electrochemically oxidized by anodes 96 and 97.

Simultaneously, the outer zone 117 of the flame completely oxidizes a portion of the fuel to generate heat. The flame is deflected from direct impingement on the cells by baffle 115. The heated reaction products from the outer zone of the flame are convectively transported upwardly around the unit exteriorly of the cathodes 106 and 108. The convective currents serve to heat the cell and promote air circulation to the cathodes. Electrical energy is taken from the unit at terminals 118 and 119.

FIGURE 5 illustrates a fuel battery unit 200 comprised of a plurality of intermediate temperature fuel cells 201. Each cell includes an anode 203, an electrolyte component 204, and a cathode 205. The cells are separated by fuel spacers 207 alternated with oxidant spacers 208. The oxidant spacers each include an inlet port 210 and an outlet port 211, and the fuel spacers similarly each include an inlet port 212 and an outlet port 213. The battery is held assembled by end plates 215 and 216 and by tie-bolt assemblies 217.

Surrounding the battery is schematically shown a thermally insulative enclosure 219. The enclosure is provided with inlet openings 220 and an exhaust port 221. Fuel is supplied to the battery by a conduit having burner ports 224 spaced therealong. Baffles 225 are mounted above the burner to deflect flames away from the electrolyte components of the cells. The baffles are supported by tubes 226 which are in turn mounted in the inlet ports 212.

The cells forming the battery are schematically shown connected electrically in series by a plurality of jump leads 228 connecting each cell anode, except the anode adjacent end plate 215, to the cathode of the next adjacent cell. One battery terminal 229 is provided by connection to the anode adjacent the end plate 215 while a second battery terminal is provided by connection to the cathode adjacent end plate 216.

The cells of the fuel battery unit 200 operate substantially similarly as the double cell unit 90, except that a solid or matrix type electrolyte component is shown instead of a circulating liquid electrolyte. As shown, the cells are chosen of a type designed to operate substantially below flame temperature.

Our invention is further illustrated by reference to the following working examples.

EXAMPLE 1

A double cell unit was constructed generally similar to unit 90 in FIGURE 4, except that a matrix or solid electrolyte component was substituted for each of the shims 99 and 100. The electrolyte circulation conduits 102, 103, and 105 were, of course, omitted.

To form each of the electrolyte components, hydrous zirconia and phosphoric acid were mixed together and an aqueous dispersion of polytetrafluoroethylene (PTFE) added while stirring. Excluding water, the weight percent of ingredients was 23 percent zirconia, 65 percent phosphoric acid (specific gravity 1.870), and 21 percent PTFE. After thorough hand mixing, the slurry was dried at 150° C. for approximately 16 hours. A rubbery residue was left after drying which was frozen with liquid nitrogen and ground into a particulate powder. The powder was spread on a 2 inch diameter press surface and compacted for 2 minutes at 20,000 pounds force at room temperature. The resulting disk was about 1 mm. in thickness.

To apply electrodes to each electrolyte component, platinum black was blended with 15 percent by weight PTFE, based on the weight of the mixture and spread on aluminum foil to yield 15 mg./$cm.^2$ platinum black. The aluminum foil was placed adjacent opposite surfaces of the electrolyte component and pressed for 2 minutes at about 100 pounds force and 350° C. After pressing, the aluminum foil was partially stripped from the resulting assembly and the remaining foil was removed using warm phosphoric acid. As each electrolyte component with catalyst on opposite faces was mounted in the double cell unit, a tantalum screen current collector was mounted in contact with the catalyst to form a complete electrode adjacent each face. Each unit electrode had an effective surface area of 11.4 $cm.^2$.

Propane was supplied to the burner and the fuel inlet tube was placed in the flame above the burner such that the lower open end extended into the inner, partial oxidation zone. The unit baffle deflected the outer, complete oxidation zone away from direct impingement with the electrolyte or electrodes. Connected electrically in series as shown in FIGURE 4, the unit exhibited the electrical characteristics set out in Table I at the indicated temperatures of operation.

TABLE I

| 100° C. | | 120° C. | |
| --- | --- | --- | --- |
| Potential (volts) | Current (ma.) | Potential (volts) | Current (ma.) |
| 1.50 | 17 | 1.90 | 0 |
| 1.42 | 24 | 1.00 | 100 |
| 1.20 | 40 | | |
| 1.12 | 56 | | |
| 0.70 | 100 | | |

EXAMPLE 2

To form an electrolyte component, a slurry of 200 mesh magnesium oxide particles was first prepared in a 24° Baumé aqueous magnesium chloride solution and the slurry poured into a two and one-half inch diameter by one-half inch deep mold cavity. Water was removed from the poured casting by vacuum through the porous bottom in the mold cavity and residual magnesium chloride reacted with the magnesium oxide to increase the handling strength of the cast disk. The disk was removed from the mold cavity and fired at 1800° C. to fully mature the ceramic followed by slow cooling over a twelve-hour period to room temperature. A two-inch diameter, 3/32 inch thick matrix was cut from the disk and this matrix was impregnated with 4 grams of an equi-part by weight mixture of lithium carbonate, sodium carbonate, and potassium carbonate, the excess being allowed to drain away.

The electrolyte component was provided with a porous nickel anode and a porous silver cathode and mounted in a fuel cell unit similar to unit 50 in FIGURE 3. The unit employed differed from FIGURE 3 only in using fuel taken from the inlet fuel conduit as well as the exhaust fuel conduit to heat the unit. Propane was employed as a fuel, and the unit was maintained at approximately 700° C. The active surface area of each electrode was 15.5 $cm.^2$. The electrical characteristics obtained in operation are set out in Table II.

TABLE II

| Potential (volts): | Current (ma.) |
| --- | --- |
| 0.87 | 0 |
| 0.80 | 55 |
| 0.70 | 105 |
| 0.60 | 150 |
| 0.50 | 175 |
| 0.40 | 205 |
| 0.30 | 260 |

While our invention is disclosed with reference to certain preferred specific embodiments, it is appreciated that numerous modifications will be obvious to those skilled in the art. For example, while the unit shown in FIGURE 4 is provided with shims and liquid electrolyte circulation conduits, this unit could be provided with a matrix type electrolyte component instead, similar to that illustrated in FIGURES 1, 2, 3, and 5. Similarly, the units shown in FIGURES 1, 2, 3, and 5 could alternately be provided with electrolyte shims and conduits of the type shown in FIGURE 4. Further, while the units shown in FIGURES 1, 2, 3, and 5 are provided with an enclosure, such enclosure may be omitted as illustrated in FIGURE 4. The enclosures of each of the units may be provided with both primary and secondary oxidant inlets as shown in FIGURES 1 and 2 or only with primary oxidant inlets as shown in FIGURES 3 and 5. The units shown in FIGURES 1 and 2 may be provided with flame baffles as shown in FIGURES 4 and 5. Also, flame baffles may be omitted from the units of FIGURES 4 and 5. Additionally, each of the units may be provided with oxidant conduits as illustrated in FIGURE 2 or oxidant conduits may be omitted as illustrated in the remaining figures.

While certain of the units are shown as single cell units and others as multiple cell units, it is appreciated that all units shown may be formed as either single or multiple cell units. Further, while the multiple cell units are shown connected electrically in series, these units may alternately be connected in parallel. Still further, while the multiple cell units are illustrated in so-called back-to-back arrangement with adjacent cells sharing oxidant and fuel chambers, it is appreciated that the units may be arranged with each cell provided with its individual fuel and oxidant chambers, as is well understood in the art.

These and other, similar obvious modifications may be undertaken without departing from the teaching of our invention. It is accordingly intended that the scope of our invention be determined by reference to the following claims.

What we claim as new and desire to secure by Letters Patent of the United States is:

1. In a process for generating electrical energy from an intermediate temperature fuel cell including an anode, a cathode, and an electrolyte therebetween which comprises supplying a single stage reacting fuel to the anode, and supplying at least an oxidant to the cathode, the improvement comprising reacting electrochemically a portion of the fuel at the anode and burning a portion of the fuel contiguous the anode to produce a flame thereby heating the cell to its operating temperature.

2. In a process as in claim 1, wherein the fuel reaction products from the burned fuel at the anode are mixed with oxidant and conveyed convectively to the cathode.

3. In a process as in claim 1, wherein the burning fuel is in contact with the anode.

4. In a process as in claim 1, wherein the burning fuel is deflected from the direct contact with the fuel cell.

5. In a process for generating electrical energy from an intermediate temperature fuel cell including an anode, a cathode and an electrolyte therebetween which comprises supplying a multi-stage reacting fuel to the anode, and supplying at least an oxidant to the cathode, the improvement comprising burning the fuel adjacent the anode thereby oxidizing partially the fuel, reacting electrochemically a portion of the partially oxidized fuel at the anode, burning completely the remainder of the fuel thereby oxidizing the fuel and heating the cell to its operating temperature, conveying convectively the fuel reaction products from the burnt fuel at the anode towards the cathode, mixing oxidant with the reaction products, and conveying convectively the mixture of reaction products and oxidant to the cathode.

6. In a process as in claim 5, wherein the burning fuel is in contact with the anode.

7. In a process as in claim 5, wherein burning fuel is deflected from direct contact with the fuel cell.

8. In an intermediate temperature fuel cell comprising an anode, a cathode, means to supply at least one oxidant to the cathode, and an electrolyte between the anode and cathode, the improvement comprising means including a burner means constructed and arranged with respect to the fuel cell to simultaneously supply a fuel to the anode and apply heat to the fuel cell, and a thermally insulative enclosure provided with inlet openings surrounding the fuel cell.

9. In an intermediate temperature fuel cell comprising an anode, a cathode, means to supply at least one oxidant to the cathode, and an electrolyte between the anode and cathode, the improvement comprising means including a burner means constructed and arranged with respect to the fuel cell to simultaneously supply a fuel to the anode and apply heat to the fuel cell, and an inlet tube with an external baffle positioned adjacent the fuel cell between the anode and the burner means.

References Cited

UNITED STATES PATENTS

| | | | |
|---|---|---|---|
| 353,141 | 11/1886 | Kendall | 136—86 |
| 3,177,097 | 4/1965 | Beals | 136—86 |
| 3,259,523 | 7/1966 | Faris et al. | 136—86 |
| 3,266,938 | 8/1966 | Parker et al. | 136—86 |
| 3,297,483 | 1/1967 | McEvoy | 136—86 |
| 3,323,951 | 6/1967 | Kreiselmaier | 136—86 |

FOREIGN PATENTS 8,906    1896    Great Britain.

ALLEN B. CURTIS, Primary Examiner